（12）United States Patent
Kras et al.

(10) Patent No.: US 10,715,551 B1
(45) Date of Patent: *Jul. 14, 2020

(54) SYSTEMS AND METHODS FOR SUBSCRIPTION MANAGEMENT OF SPECIFIC CLASSIFICATION GROUPS BASED ON USER'S ACTIONS

(71) Applicant: KnowBe4, Inc., Clearwater, FL (US)

(72) Inventors: Greg Kras, Dunedin, FL (US); Alin Irimie, Clearwater, FL (US)

(73) Assignee: KnowBe4, Inc., Clearwater, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/806,459

(22) Filed: Mar. 2, 2020

Related U.S. Application Data

(63) Continuation of application No. 16/220,502, filed on Dec. 14, 2018, now Pat. No. 10,581,911, which is a
(Continued)

(51) Int. Cl.
*H04L 29/06* (2006.01)
*G06F 21/55* (2013.01)
(Continued)

(52) U.S. Cl.
CPC ........ *H04L 63/1483* (2013.01); *G06F 21/552* (2013.01); *G06F 21/56* (2013.01); *G06F 21/577* (2013.01); *H04L 63/1433* (2013.01)

(58) Field of Classification Search
CPC ............. H04L 63/1483; H04L 63/1433; G06F 21/552; G06F 21/56; G06F 21/577
See application file for complete search history.

(56) References Cited

U.S. PATENT DOCUMENTS 8,601,587 B1 12/2013 Powell et al.
8,615,807 B1 12/2013 Higbee et al.
(Continued)

FOREIGN PATENT DOCUMENTS

WO WO-2016/164844 A1 10/2016

OTHER PUBLICATIONS

"Educating Users to Improve Awareness, Change Behaviors, and Reduce Risk," Wombat Security Technologies, www.wombatsecurity. com/security-education/educate as archived by web.archive.org on Mar. 15, 2016.
(Continued)

*Primary Examiner* — Darren B Schwartz
(74) *Attorney, Agent, or Firm* — Foley & Lardner LLP

(57) ABSTRACT

Embodiments of the disclosure describe systems and methods for selecting a first group of users, which is selected to receive simulated phishing emails as part of a simulated phishing campaign, and adding users to a second group of users based upon those selected users interacting with a simulated phishing email that is part of a simulated phishing campaign; tracking the completion of remediation training related to phishing emails by users in the second group of users and receiving one or more indications that the users in the second group of users have completed remedial training; and automatically adding users, who are members of the second user group, to the first user group, to a third user group, or to a predetermined user group responsive to the one or more indications that the users in the second group of users have completed remedial training.

20 Claims, 12 Drawing Sheets

Related U.S. Application Data continuation of application No. 15/904,109, filed on Feb. 23, 2018, now Pat. No. 10,158,668, which is a continuation of application No. 15/674,757, filed on Aug. 11, 2017, now Pat. No. 9,906,555, which is a continuation of application No. 15/481,041, filed on Apr. 6, 2017, now Pat. No. 9,742,803.

(51) Int. Cl.
*G06F 21/56* (2013.01)
*G06F 21/57* (2013.01)

(56) References Cited

U.S. PATENT DOCUMENTS

| | | | |
|---|---|---|---|
| 8,635,703 B1 * | 1/2014 | Belani | H04L 63/1433 726/25 |
| 8,719,940 B1 * | 5/2014 | Higbee | H04L 63/1475 726/24 |
| 8,910,287 B1 | 12/2014 | Belani et al. | |
| 8,966,637 B2 | 2/2015 | Belani et al. | |
| 9,053,326 B2 | 6/2015 | Higbee et al. | |
| 9,154,514 B1 | 10/2015 | Prakash | |
| 9,246,936 B1 | 1/2016 | Belani et al. | |
| 9,253,207 B2 | 2/2016 | Higbee et al. | |
| 9,262,629 B2 | 2/2016 | Belani et al. | |
| 9,325,730 B2 | 4/2016 | Higbee et al. | |
| 9,356,948 B2 | 5/2016 | Higbee et al. | |
| 9,398,038 B2 | 7/2016 | Higbee et al. | |
| 9,565,059 B1 | 2/2017 | Manmohan et al. | |
| 9,591,017 B1 | 3/2017 | Higbee et al. | |
| 9,635,052 B2 | 4/2017 | Hadnagy | |
| 9,667,645 B1 | 5/2017 | Belani et al. | |
| 9,674,221 B1 | 6/2017 | Higbee et al. | |
| 9,774,626 B1 | 9/2017 | Himler et al. | |
| 9,781,149 B1 | 10/2017 | Himler et al. | |
| 9,824,609 B2 * | 11/2017 | Sadeh-Koniecpol | G06F 21/55 |
| 9,876,753 B1 | 1/2018 | Hawthorn | |
| 9,912,687 B1 | 3/2018 | Wescoe et al. | |
| 9,942,249 B2 | 4/2018 | Gatti | |
| 9,998,480 B1 | 6/2018 | Gates et al. | |
| 10,243,904 B1 | 3/2019 | Wescoe et al. | |
| 2003/0115550 A1 | 6/2003 | Womble et al. | |
| 2004/0128355 A1 | 7/2004 | Chao et al. | |
| 2006/0224511 A1 | 10/2006 | Allemann | |
| 2008/0046738 A1 | 2/2008 | Galloway et al. | |
| 2008/0071610 A1 | 3/2008 | Dhillon et al. | |
| 2008/0115190 A1 | 5/2008 | Aaron | |
| 2008/0254419 A1 | 10/2008 | Cohen | |
| 2009/0144308 A1 * | 6/2009 | Huie | H04L 63/1441 |
| 2009/0241168 A1 | 9/2009 | Readshaw | |
| 2010/0077483 A1 | 3/2010 | Stolfo et al. | |
| 2010/0132052 A1 | 5/2010 | Saito | |
| 2010/0313264 A1 | 12/2010 | Xie et al. | |
| 2011/0117534 A1 | 5/2011 | Berger et al. | |
| 2012/0124671 A1 * | 5/2012 | Fritzson | H04L 63/14 726/26 |
| 2012/0258437 A1 * | 10/2012 | Sadeh-Koniecpol | G06F 21/564 434/362 |
| 2012/0297477 A1 | 11/2012 | Raviv | |
| 2013/0198846 A1 | 8/2013 | Chapman | |
| 2014/0082726 A1 | 3/2014 | Dreller et al. | |
| 2014/0199663 A1 | 7/2014 | Sadeh-Koniecpol et al. | |
| 2014/0199664 A1 | 7/2014 | Sadeh-Koniecpol et al. | |
| 2014/0230050 A1 | 8/2014 | Higbee et al. | |
| 2014/0230061 A1 | 8/2014 | Higbee et al. | |
| 2015/0101008 A1 | 4/2015 | Zent et al. | |
| 2015/0229664 A1 * | 8/2015 | Hawthorn | H04L 63/1433 726/25 |
| 2015/0287339 A1 | 10/2015 | Deshmukh et al. | |
| 2016/0036829 A1 * | 2/2016 | Sadeh-Koniecpol | G06F 21/565 726/23 |
| 2016/0164898 A1 | 6/2016 | Belani et al. | |
| 2016/0203724 A1 | 7/2016 | Heenan et al. | |
| 2016/0234245 A1 | 8/2016 | Chapman | |
| 2016/0261621 A1 | 9/2016 | Srivastava et al. | |
| 2016/0301705 A1 * | 10/2016 | Higbee | H04L 63/1433 |
| 2016/0301716 A1 | 10/2016 | Sadeh-Koniecpol et al. | |
| 2016/0308897 A1 | 10/2016 | Chapman | |
| 2016/0330238 A1 * | 11/2016 | Hadnagy | H04L 63/1483 |
| 2016/0366167 A1 | 12/2016 | Yumer | |
| 2017/0026399 A1 * | 1/2017 | Gatti | H04L 63/1433 |
| 2017/0103674 A1 | 4/2017 | Sadeh-Koniecpol et al. | |
| 2017/0272453 A1 | 9/2017 | Murray et al. | |
| 2019/0173819 A1 | 6/2019 | Wescoe et al. | |
| 2019/0215335 A1 | 7/2019 | Benishti et al. | |
| 2019/0245885 A1 | 8/2019 | Starink et al. | |
| 2019/0245894 A1 | 8/2019 | Epple et al. | |

OTHER PUBLICATIONS

International Preliminary Report on Patentability for PCT/US2018/021054, dated Oct. 17, 2019.
International Search Report and Written Opinion for PCT/US2018/021054, dated May 17, 2018.
Notice of Allowance for U.S. Appl. No. 15/481,041, dated Jul. 6, 2017.
Notice of Allowance for U.S. Appl. No. 15/674,757, dated Nov. 24, 2017.
Notice of Allowance for U.S. Appl. No. 15/904,109, dated Aug. 15, 2018.
Notice of Allowance for U.S. Appl. No. 16/220,502, dated Jan. 14, 2020.
Notice of Allowance for U.S. Appl. No. 16/220,502, dated Sep. 24, 2019.
U.S. Office Action on U.S. Appl. No. 15/904,109 dated Apr. 6, 2018.

* cited by examiner

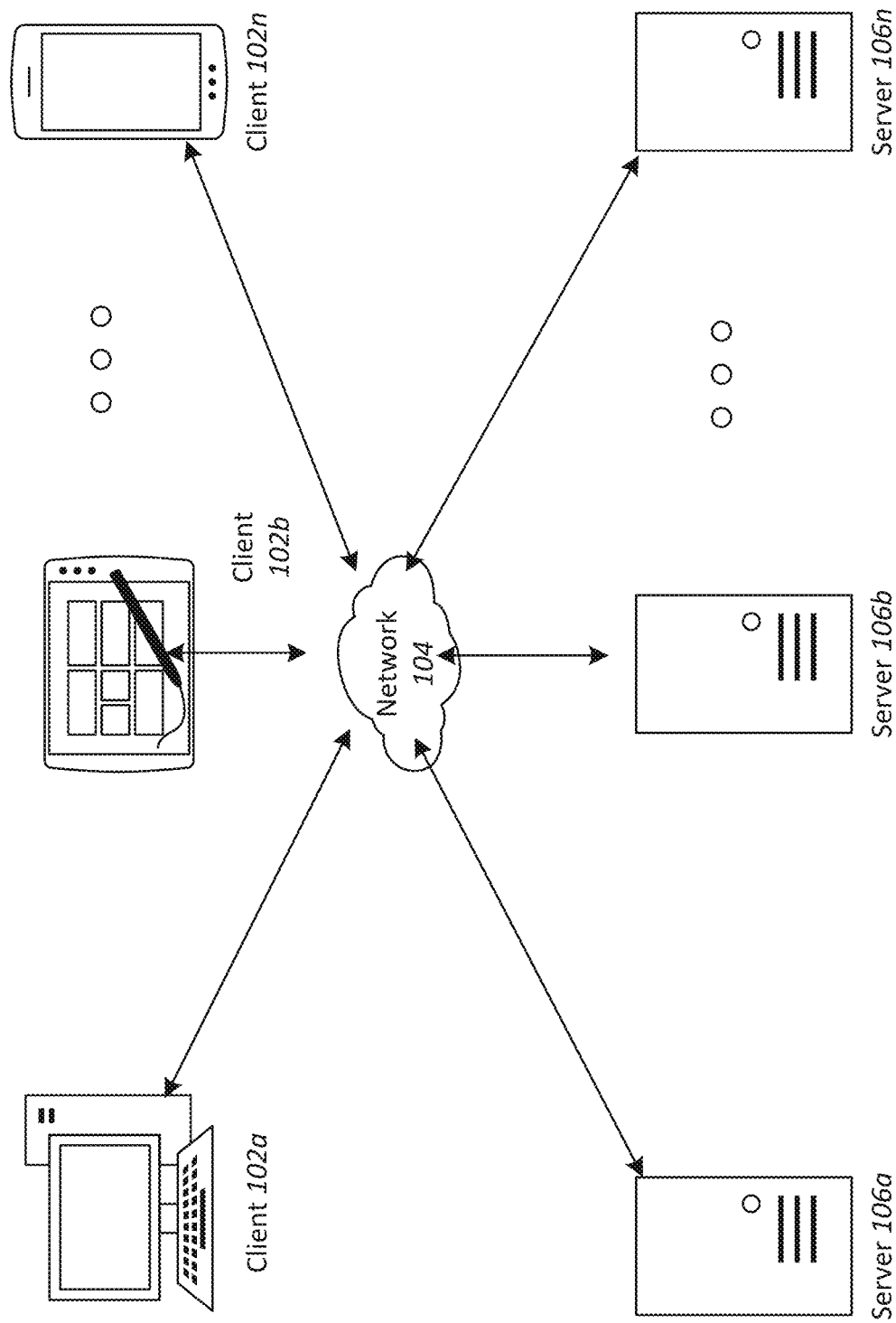

300

Receiving a selection of a first user group for which to communicate simulated phishing emails of a simulated phishing campaign
310

↓

Receiving a selection of a second user group for which to add those users that interact with a simulated phishing email
320

↓

Receiving a first indication that a user of the first user group interacted with a simulated phishing email
330

↓

Responsive to the indication, automatically adding the user, who is a member of the first user group, to the second user group
340

↓

Receiving a second indication that the user completed remediation training
350

↓

Responsive to the second indication, adding the user, who is a member of the second user group, back to the first user group or to a third user group
360

```
Receiving a selection of a first user group for which to
communicate simulated phishing emails of a simulated
phishing campaign
310
           │
           ▼
Receiving a selection of a second user group for which to
add those users that interact with a simulated phishing
email
320
           │
           ▼
Receiving a first indication that a user of the first user
group interacted with the simulated phishing email
330
           │
           ▼
Tracking the number of times the user has interacted with
simulated phishing emails
332
           │
           ▼
Automatically adding the user, who is a member of the first
user group, to the second user group responsive to the
number of times the user has interacted with simulated
phishing emails reaching a predetermined threshold
342
           │
           ▼
Receiving a second indication that the user completed
remediation training
350
           │
           ▼
Responsive to the second indication, adding the user, who
is a member of the second user group, back to the first user
group or to a third user group
360
```

```
Receiving a selection of a first user group for which to
communicate simulated phishing emails of a simulated
phishing campaign
310
              ↓
Receiving a selection of a second user group for which to
add those users that interact with a simulated phishing
email
320
              ↓
Receiving a first indication that a user of the first user
group interacted with the simulated phishing email
330
              ↓
Responsive to the indication, automatically adding the
user, who is a member of the first user group, to the
second user group
340
              ↓
Tracking the number of courses of electronically tracked
remediation training the user has completed
344
              ↓
Receiving a second indication that the user completed
remediation training
350
              ↓
Responsive to the second indication, automatically adding
the user of the second user group to a predetermined user
group corresponding to one or more courses of the number
of courses the user has completed
362
```

Receiving a selection of a first user group for which to communicate simulated phishing emails of a simulated phishing campaign
310

Receiving a selection of a second user group for which to add those users that interact with a simulated phishing email
320

Receiving a first indication that a user of the first user group interacted with the simulated phishing email
330

Responsive to the indication, automatically adding the user, who is a member of the first user group, to the second user group
340

Receiving a second indication that the user completed remediation training
350

Responsive to the second indication, keeping the user in the second user group while adding the user back to the first user group or to the third user group
354

SYSTEMS AND METHODS FOR SUBSCRIPTION MANAGEMENT OF SPECIFIC CLASSIFICATION GROUPS BASED ON USER'S ACTIONS

RELATED APPLICATIONS

This application is a continuation of and claims the benefit of and priority to U.S. Non-Provisional application Ser. No. 16/220,502, titled, "SYSTEMS AND METHODS FOR SUBSCRIPTION MANAGEMENT OF SPECIFIC CLASSIFICATION GROUPS BASED ON USER'S ACTIONS," and filed Dec. 14, 2018, which is a continuation of and claims the benefit of and priority to U.S. Non-Provisional application Ser. No. 15/904,109, titled, "SYSTEMS AND METHODS FOR SUBSCRIPTION MANAGEMENT OF SPECIFIC CLASSIFICATION GROUPS BASED ON USER'S ACTIONS," and filed Feb. 23, 2018, which is a continuation of and claims the benefit of and priority to U.S. Non-Provisional application Ser. No. 15/674,757, titled "SYSTEMS AND METHODS FOR SUBSCRIPTION MANAGEMENT OF SPECIFIC CLASSIFICATION GROUPS BASED ON USER'S ACTIONS," and filed on Aug. 11, 2017, which is a continuation of and claims the benefit of and priority to U.S. Non-Provisional application Ser. No. 15/481,041, titled "SYSTEMS AND METHODS FOR SUBSCRIPTION MANAGEMENT OF SPECIFIC CLASSIFICATION GROUPS BASED ON USER'S ACTIONS," and filed on Apr. 6, 2017, all of which are incorporated herein by reference in their entirety for all purposes.

FIELD OF THE DISCLOSURE

This disclosure generally relates to systems and methods for managing users via user groups in association with simulated phishing attacks. In particular, the disclosure is directed to systems and methods for adding users to certain user groups based on interactions of the users with simulated phishing attacks.

BACKGROUND OF THE DISCLOSURE

It can be useful to perform simulated phishing attacks on a user or a set of users. A phishing attack involves an attempt to acquire sensitive information such as usernames, passwords, credit card details, etc., often for malicious reasons, possibly by masquerading as a trustworthy entity. For example, an email may be sent to a target, the email having an attachment that performs malicious actions when executed or a link to a webpage that either performs malicious actions when accessed or prompts the user to execute a malicious program. Malicious actions may be malicious data collection or actions harmful to the normal functioning of a device on which the email was activated, or any other malicious actions capable of being performed by a program or a set of programs. Simulated phishing attacks allow an organization to determine the level of vulnerability to phishing attacks of a user or set of users. This knowledge can be used by internet technology organizations to reduce this level of vulnerability through tools or training.

BRIEF SUMMARY OF THE DISCLOSURE

Methods, systems, and apparatus are provided in which a system automatically adds users to user groups depending on the interaction with simulated phishing emails and with remediation training. Users are put into user groups and user groups are associated with simulated phishing campaigns or events and interactions of the simulated phishing campaigns. A simulated phishing campaign is configured to send one or more simulated phishing emails to the user groups that are selected for that campaign. If any of the users that are in the user group for the simulated phishing campaign interact with any of the simulated phishing emails that are sent as part of that simulated phishing campaign, then the system receives an indication that the user has interacted with a simulated phishing email. In response to this indication, the system automatically adds the user to a second user group. The second user group is required to complete remediation training with respect to phishing emails.

In some embodiments, users in a user group are removed when the users are added to another user group. For example, when the user is added to the second user group the user is removed from the first user group. Then, responsive to the user completing remediation training, the system automatically adds the user back to the first user group. Also, in some embodiments, the user is removed from the second user group when the user is added back to the first user group.

In other embodiments, users remain a member of a user group when the users are added to another user group. For example, the user added to the second user group remains a member of the first user group. In another example, the user added back to the first user group remains a member of the second user group.

The system may also automatically add the user to a third user group.

There are also embodiments where added users are removed from one user group but the same added users remain members of a different user group. For example, the system may leave the user in the second user group and also add the user back to the first user group or to the third user group. In this example, the user was removed from the first user group when the user was added to the second user.

There may be several simulated phishing emails that are part of the simulated phishing campaign. The system may electronically track the number of times the user has interacted with simulated phishing emails and may automatically add the user to a user group responsive to the number of times the user has interacted with the simulated phishing emails. The simulated phishing emails that the user interacts with may all be part of one simulated phishing campaign, or they may be part of more than one simulated phishing campaign.

The methods, systems, and apparatus further provide remediation training for users. The remediation training may be specifically related to phishing emails. The remediation training may encompass other types of social engineering organizational attacks. The remediation training may be in the form of courses. The system may electronically track the number of courses of remediation training that a user has completed. In particular, the system may electronically track the number of courses of remediation training that a user has completed since the system added the user to the second user group. The system may automatically add the user to user groups, responsive to an indication that the user has completed a number of electronically tracked remediation training courses.

In one embodiment, a method is provided for adding users to user groups based on a users' interactions with simulated phishing emails, the method including a server receiving a selection of a first user group for which to communicate phishing emails as part of a simulated phishing campaign, and a selection of a second user group for which to add those users that interact with a simulated phishing email, the second user group selected for electronically tracked remediation training regarding phishing emails. In response to an indication that a user of the first user group interacted with the simulated phishing email, the method automatically adds the user, who is a member of the first user group, to the second user group.

As described above, in some embodiments, users in a user group are removed from that user group when the users are added to another user group. For example, when the user is added to the second user group the user is removed from the first user group. In response to an indication that the user has completed remediation training, the method automatically adds the user, who is a member of the second user group, back to the first user group or to a third user group. Also, in some embodiments, the user is removed from the second user group when the user is added back to the first user group or to the third user group.

In other embodiments, users remain members of a user group when the users are added to another user group. For example, the user added to the second user group remains saved in the first user group. In another example, the user remains a member of the second user group when the user is added back to the first user group or to the third user group.

In another embodiment, a system is provided for adding users to user groups based on a users' interactions with simulated phishing emails. The system including a server that is able to receive a selection of a first user group for which to communicate simulated phishing emails and a second user group for which to add those users that interact with a simulated phishing email, and the server is configured to add the user to the second user group responsive to receiving an indication that the user interacted with the simulated email. The server is further configured to add the user back to the first user group (for embodiments where the user was removed from the first user group) or to a third user group responsive to an indication that the user completed remediation training regarding phishing emails.

In another embodiment, a method is provided for adding users to a second user group responsive to receiving an indication of detection of an event in connection with the user of the first user group. In one embodiment, the event may be a number of times that the user interacts with simulated phishing emails. In one embodiment, the event may be a number of courses of the electronically tracked remediation training the user has completed since a last time the user interacted with a simulated phishing email. In another embodiment, the event may be the number of simulated phishing campaigns run since a last time the user interacted with a simulated phishing email.

In another embodiment, a method is provided for moving users between user groups based on a user's interactions with simulated phishing emails. The method includes receiving, by a server executing on a processor coupled to memory, a selection of a first user group for which to communicate simulated phishing emails of a simulated phishing campaign and a second user group for which to add those users that interact with a simulated phishing email. The second user group is selected for electronically tracked remediation training of users regarding phishing emails. The server receives a first indication that a user of the first user group interacted with the simulated phishing email. Responsive to the first indication, the server automatically moves the user from the first user group to the second user group (e.g., in some embodiments, the server automatically moves the user from the first user group to the second user group responsive to the number of times reaching a predetermined threshold). The server receives a second indication that the user completed the electronically tracked remediation training regarding phishing emails. Responsive to the second indication, the server automatically moves the user from the second user group to one of the first user group or a third user group. In some embodiments, the server automatically moves the user from the second user group to a predetermined user group corresponding to one or more courses of a number of courses of the electronically tracked remediation training the user has completed. In other embodiments, the server moves the user from the second user group to the third user group selected for those users that interacted with the simulated phishing email and completed the electronically tracked remediation training.

In another embodiment, a system is provided for moving users between user groups based on a user's interactions with simulated phishing emails. The system includes a server executing on a processor coupled to memory, configured to receive a selection of a first user group for which to communicate simulated phishing emails of a simulated phishing campaign and a second user group for which to add those users that interact with a simulated phishing email. The second user group is selected for electronically tracked remediation training of users regarding phishing emails. The server is configured to receive a first indication that a user of the first user group interacted with the simulated phishing email. Responsive to the first indication, the server automatically moves the user from the first user group to the second user group. The server is configured to receive a second indication that the user completed the electronically tracked remediation training regarding phishing emails. Responsive to the second indication, the server automatically moves the user from the second user group to one of the first user group or a third user group. In a further embodiment, the server is configured to automatically move the user from the first user group to the second user group responsive to the number of times reaching a predetermined threshold. In another further embodiment, the server is configured to automatically move the user from the second user group to a predetermined user group corresponding to one or more courses of the number of courses being completed. In another further embodiment, the server is configured to move the user from the second user group to the third user group selected for those users that interacted with the simulated phishing email and completed the electronically tracked remediation training.

In another embodiment, a method is provided for moving a user between user groups based on events associated with the user. The method includes identifying, via a server executing on a processor coupled to memory, a first user group for which to communicate simulated phishing emails of a simulated phishing campaign, an event, and a second user group for which to add users to upon detecting the event in connection with the users. The server receives an indication of a detection of the event in connection with a user of the first user group. Responsive to the indication of the detection of the event, the server automatically moves the user from the first user group to the second user group.

In another embodiment, a system is provided for moving a user between specific user groups based on events associated with the user. The method includes a server executing on a processor coupled to memory configured to identify a first user group for which to communicate simulated phishing emails of a simulated phishing campaign, an event, and a second user group for which to add users to upon detecting the event in connection with the users. The server is configured to receive an indication of a detection of the event in connection with a user of the first user group. Responsive to the indication of the event, the server automatically moves the user from the first user group to the second user group.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 1A is a block diagram depicting an embodiment of a network environment comprising a client device in communication with a server device;

FIG. 3A depicts an implementation of a method for adding users to user groups responsive to a user interacting with simulated phishing emails and responsive to a user completing electronically tracked remediation training.

FIG. 3B depicts an embodiment of the method whereby the system tracks the number times the user of a first user group has interacted with simulated phishing emails and adds the user to a second user group responsive to this number reaching a predetermined threshold.

FIG. 3C depicts an embodiment of the method whereby the system tracks the number of courses of electronically tracked remediation training the user, who is a member of the second user group, has completed and adds the user to a predetermined user group corresponding to one or more courses of the number of courses the user has completed.

FIG. 3D depicts an embodiment of the method whereby the system adds users of a first user group to a second user group responsive to receiving an indication that a user has interacted with a simulated phishing email, and keeping the user in the second user group while adding the user back to the first user group (for embodiments where the user was removed from the first user group) or to a third user group responsive to receiving an indication that the user completed remediation training.

FIG. 4 depicts an example of creating a new phishing campaign that includes selection of a user group for which to add users that interact with a simulated phishing email of a simulated phishing campaign.

DETAILED DESCRIPTION

Figure 1B:
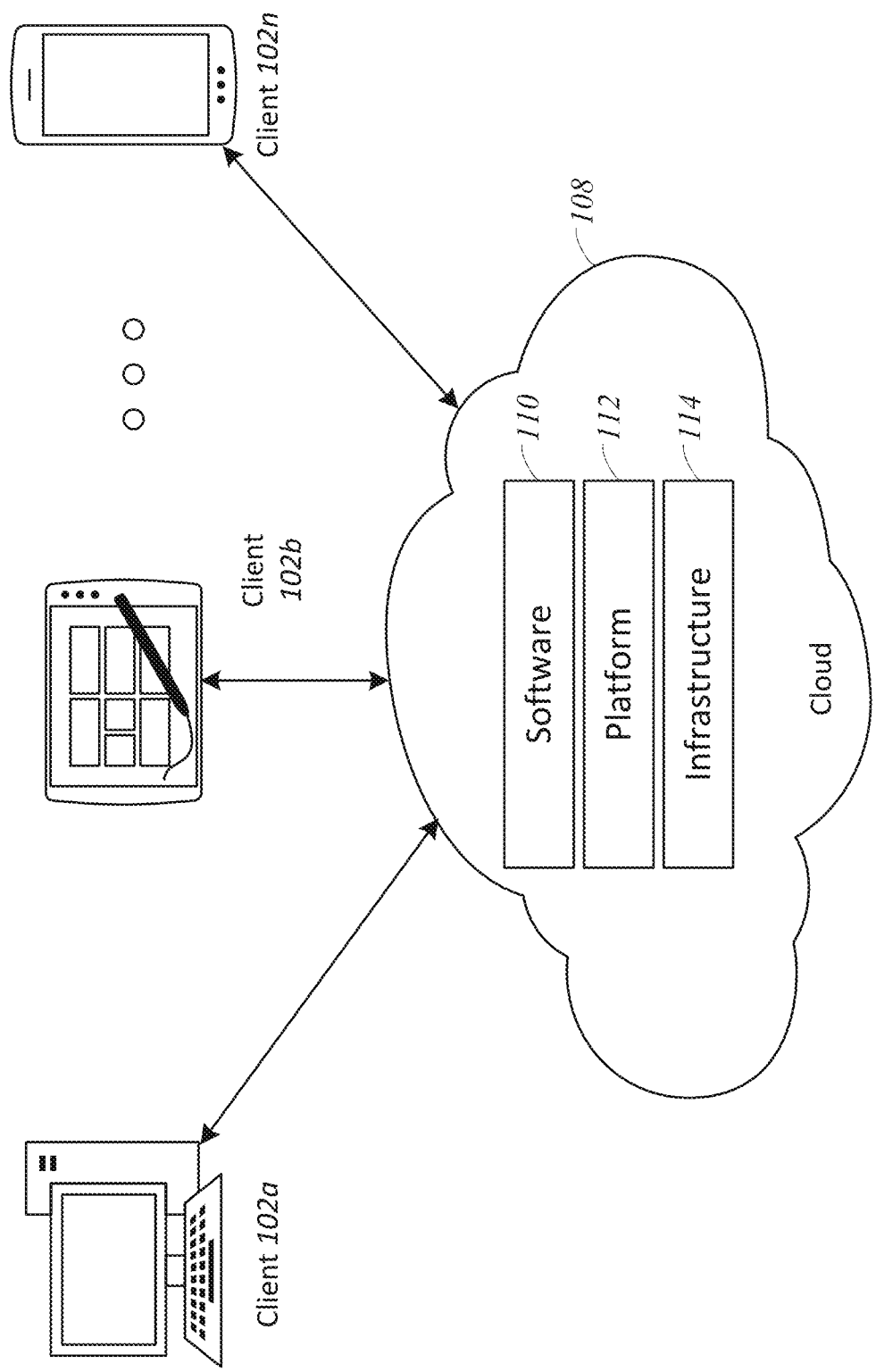
FIG. 1B is a block diagram depicting a cloud computing environment comprising a client device in communication with cloud service providers.

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for adding users to user groups.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
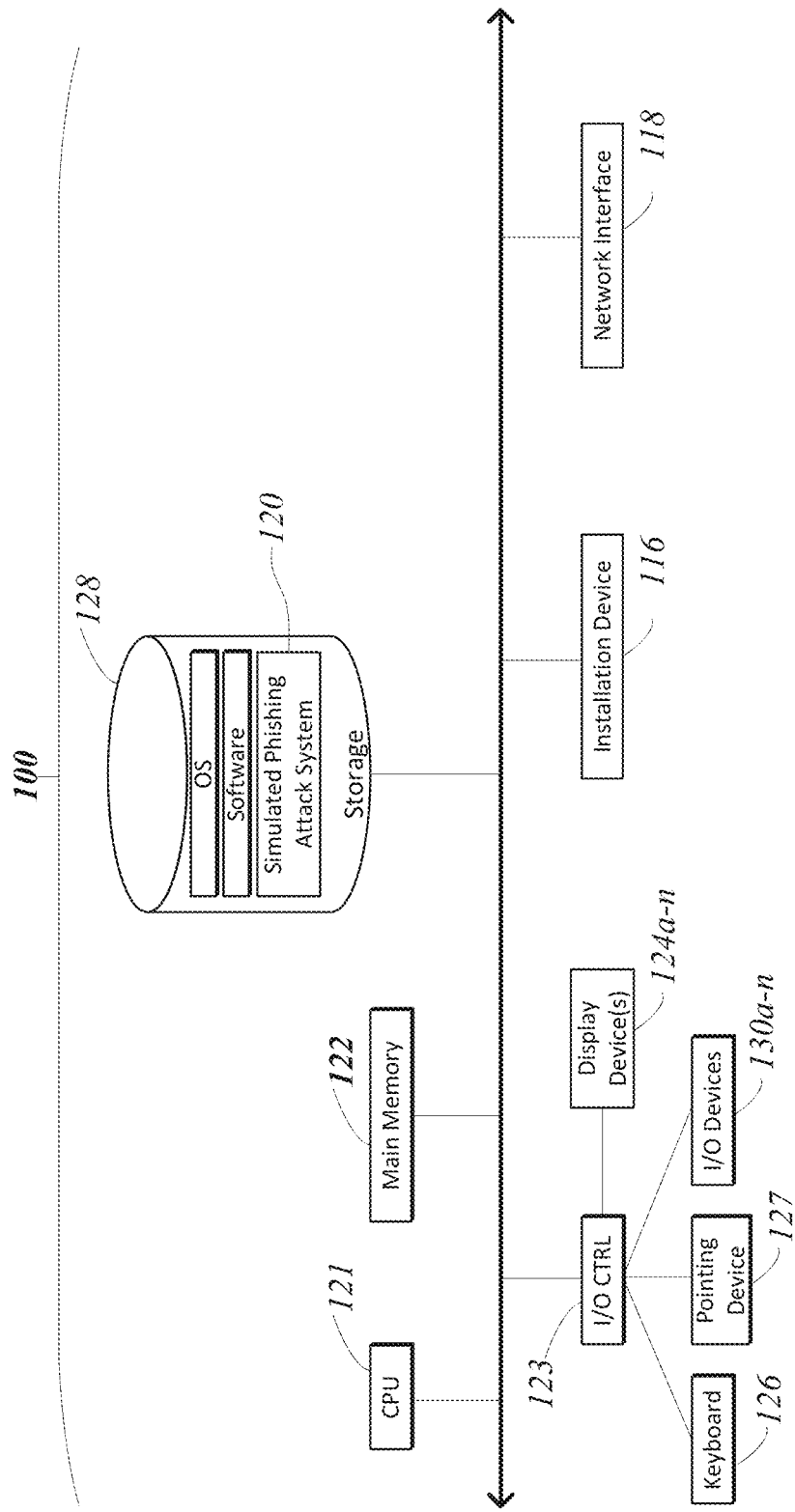
FIGS. 1C and 1D are block diagrams depicting embodiments of computing devices useful in connection with the methods and systems described herein.
Figure 1D:
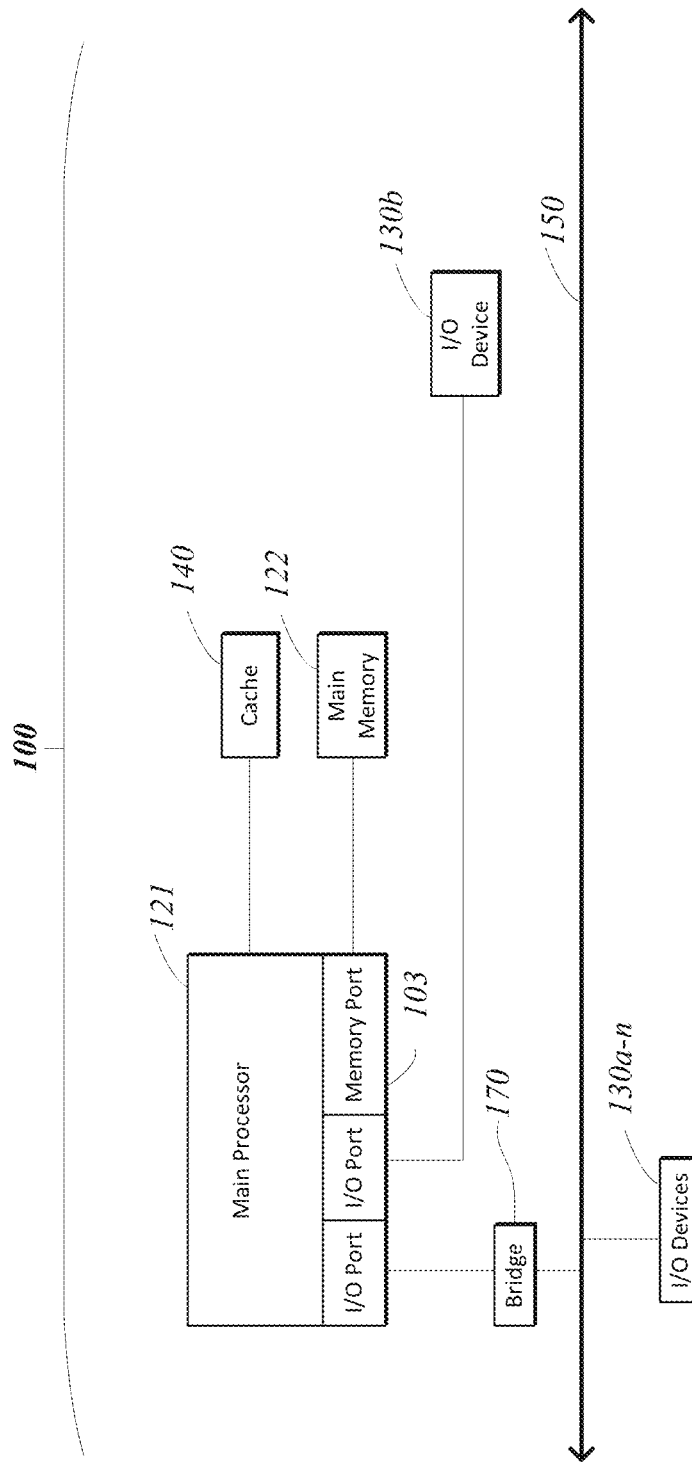

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a simulated phishing attach system 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130*b* or other processors 121' via HYPERTRANSPORT, RAPIDIO, or INFINIBAND communications technology. FIG. 1D also depicts an embodiment in which local busses and direct communication are mixed: the processor 121 communicates with I/O device 130*a* using a local interconnect bus while communicating with I/O device 130*b* directly.

A wide variety of I/O devices 130*a*-130*n* may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130*a*-130*n* may include a combination of multiple input or output devices, including, e.g., Microsoft KINECT, Nintendo Wiimote for the WII, Nintendo WII U GAMEPAD, or Apple IPHONE. Some devices 130*a*-130*n* allow gesture recognition inputs through combining some of the inputs and outputs. Some devices 130*a*-130*n* provides for facial recognition which may be utilized as an input for different purposes including authentication and other commands. Some devices 130*a*-130*n* provides for voice recognition and inputs, including, e.g., Microsoft KINECT, SIRI for IPHONE by Apple, Google Now or Google Voice Search.

Additional devices 130*a*-130*n* have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130*a*-130*n*, display devices 124*a*-124*n* or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124*a*-124*n* may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopic. Display devices 124*a*-124*n* may also be a head-mounted display (HMD). In some embodiments, display devices 124*a*-124*n* or the corresponding I/O controllers 123 may be controlled through or have hardware support for OPENGL or DIRECTX API or other graphics libraries.

In some embodiments, the computing device 100 may include or connect to multiple display devices 124*a*-124*n*, which each may be of the same or different type and/or form. As such, any of the I/O devices 130*a*-130*n* and/or the I/O controller 123 may include any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may include multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices 100*a* or 100*b* connected to the computing device 100, via the network 104. In some embodiments software may be designed and constructed to use another computer's display device as a second display device 124*a* for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124*a*-124*n*.

Referring again to FIG. 1C, the computing device 100 may comprise a storage device 128 (e.g. one or more hard disk drives or redundant arrays of independent disks) for storing an operating system or other related software, and for storing application software programs such as any program related to the simulated phishing attack system software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods of Adding Users to User Groups Based on Interactions with Simulated Phishing Attacks and Remediation Training.

This disclosure generally relates to systems and methods for adding users to user groups based on interactions with simulated phishing emails and completion of remediation training. The systems and methods allow a server to automatically add a user of a first user group to a second user group responsive to that user interacting with a simulated phishing email that was sent as part of a simulated phishing campaign. In some embodiments, users in a user group are removed when the users are added to another user group. For example, the user added to the second user group is removed from the first user group. The systems and methods further allow the server to electronically track the remediation training completed by that user, and responsive to the completion of remediation training, the server may automatically add the user, who is a member of the second user group, back to the first user group (for embodiments where the user was removed from the first user group) or to a third user group. The systems and methods further allow the server to automatically add the user to one or more user groups upon detecting an event in connection with the user.

In some embodiments, users remain members of a user group when the users are added to another user group. For example, the user remains a member of the first user group when the user is added to the second user group. In another example, the user remains a member of the second user group when the user is added back to the first user group or to the third user group.

A simulated phishing attack may test the readiness of a security system or users of a system to handle phishing attacks such that malicious actions are prevented. A simulated phishing attack may, for example, target a large number of users, such as employees of an organization. Such an attack may be performed by a party friendly or neutral to the targets of the simulated attack. In one type of simulated phishing attack, an attempt is made to extract sensitive information using phishing methods, and any extracted information is used not for malicious purposes, but as part of a process of detecting weaknesses in security. Performing a simulated phishing attack can help expose a lack of vigilance and/or know-how in a user or set of users of a device in minimizing risk associated with such attacks. User know-how can be improved by providing targeted, real-time training to the user at the time of failing a test provided by a simulated phishing attack.

A method of adding users to user groups is as follows. A system administrator, who could be a security manager or a third party on behalf of a security manager, configures a phishing email template which is used to generate simulated phishing emails that can masquerade as an email from a party known to the user, such as an executive of the company that employs the user. The email may be designed to appear interesting to the user, and may offer or promise, for example, access to an interesting tidbit of news, access to useful computer software, access to knowledge of how to perform a money making scheme, or any other thing that may be of interest. In some embodiments, the email may request that the user perform a certain action, such as providing sensitive information by replying to the email, or transferring money to an account owned by the attacker and then sending a reply email to confirm that the money has been transferred. A simulated phishing campaign is created by a simulated phishing campaign manager in accordance with selections made by the system administrator or another individual. A system administrator selects a first user group which contains the users that will be a part of the simulated phishing campaign. The system administrator selects a second user group for which to add those users that interact with a simulated phishing email that is configured to be part of the simulated phishing campaign, wherein the second user group is selected to receive electronically tracked remediation training. The system receives the selection of the first and second user groups.

The system transmits one or more simulated phishing emails, according to the created simulated phishing campaign, to the users in the first user group. The server receives a first indication if a user of the first user group interacts with a simulated phishing email of the simulated phishing campaign. Responsive to receiving the first indication, the server automatically adds the user, who is a member of the first user group, to the second user group. One example of a user interaction with a simulated phishing email is the user sending a reply to or forwarding the received email. Another example of a user interaction with a simulated phishing email is the user clicking on a link in the received email. In some embodiments, the server tracks the number of times the user interacts with simulated phishing emails and adds the user responsive to the number of times reaching a predetermined threshold. In some embodiments, the server receives an indication of a detection of an event in connection with a user, who is a member of the first user group, and responsive to receiving the indication, adds the user to a second user group.

Once a user of a first user group is automatically added to the second user group, responsive to interacting with a simulated phishing email from the simulated phishing campaign, the user will begin to receive electronically tracked remediation training. When the user completes the remediation training, the server receives a second indication. In response to the second indication, the server automatically adds the user back to the first user group (for embodiments where the user was removed from the first user group) or to a third user group. In some embodiments, the server tracks the number of courses of the electronically tracked remediation training the user has completed. In some embodiments, the server automatically adds the user, who is a member of the second user group, to a predetermined user group corresponding to one or more courses of the number of courses the user has completed. In some embodiments, the server automatically adds the user, who is a member of the second user group, back to the first user group (for embodiments where the user was removed from the first user group) or to a third user group responsive to the number of courses of electronically tracked remediation training reaching a given threshold. In further embodiments, the user may be removed from the second user group when the user is added the predetermined user group or when the user is added back to the first user group or to the third user group.

In another embodiment, a method is provided for moving users between user groups based on a user's interactions with simulated phishing emails. The method includes receiving, by a server executing on a processor coupled to memory, a selection of a first user group for which to communicate simulated phishing emails of a simulated phishing campaign and a second user group for which to add those users that interact with a simulated phishing email. The second user group is selected for electronically tracked remediation training of users regarding phishing emails. The server receives a first indication that a user of the first user group interacted with the simulated phishing email. Responsive to the first indication, the server automatically moves the user from the first user group to the second user group (e.g., in some embodiments, the server automatically moves the user from the first user group to the second user group responsive to the number of times reaching a predetermined threshold). The server receives a second indication that the user completed the electronically tracked remediation training regarding phishing emails. Responsive to the second indication, the server automatically moves the user from the second user group to one of the first user group or a third user group. In some embodiments, the server automatically moves the user from the second user group to a predetermined user group corresponding to one or more courses of a number of courses of the electronically tracked remediation training the user has completed. In other embodiments, the server moves the user from the second user group to the third user group selected for those users that interacted with the simulated phishing email and completed the electronically tracked remediation training.

In another embodiment, a system is provided for moving users between user groups based on a user's interactions with simulated phishing emails. The system includes a server executing on a processor coupled to memory, configured to receive a selection of a first user group for which to communicate simulated phishing emails of a simulated phishing campaign and a second user group for which to add those users that interact with a simulated phishing email. The second user group is selected for electronically tracked remediation training of users regarding phishing emails. The server is configured to receive a first indication that a user of the first user group interacted with the simulated phishing email. Responsive to the first indication, the server automatically moves the user from the first user group to the second user group. The server is configured to receive a second indication that the user completed the electronically tracked remediation training regarding phishing emails. Responsive to the second indication, the server automatically moves the user from the second user group to one of the first user group or a third user group. In a further embodiment, the server is configured to automatically move the user from the first user group to the second user group responsive to the number of times reaching a predetermined threshold. In another further embodiment, the server is configured to automatically move the user from the second user group to a predetermined user group corresponding to one or more courses of the number of courses being completed. In another further embodiment, the server is configured to move the user from the second user group to the third user group selected for those users that interacted with the simulated phishing email and completed the electronically tracked remediation training.

In another embodiment, a method is provided for moving a user between user groups based on events associated with the user. The method includes identifying, via a server executing on a processor coupled to memory, a first user group for which to communicate simulated phishing emails of a simulated phishing campaign, an event, and a second user group for which to add users to upon detecting the event in connection with the users. The server receives an indication of a detection of the event in connection with a user of the first user group. Responsive to the indication of the detection of the event, the server automatically moves the user from the first user group to the second user group.

In another embodiment, a system is provided for moving a user between specific user groups based on events associated with the user. The method includes a server executing on a processor coupled to memory configured to identify a first user group for which to communicate simulated phishing emails of a simulated phishing campaign, an event, and a second user group for which to add users to upon detecting the event in connection with the users. The server is configured to receive an indication of a detection of the event in connection with a user of the first user group. Responsive to the indication of the event, the server automatically moves the user from the first user group to the second user group.

Figure 2:
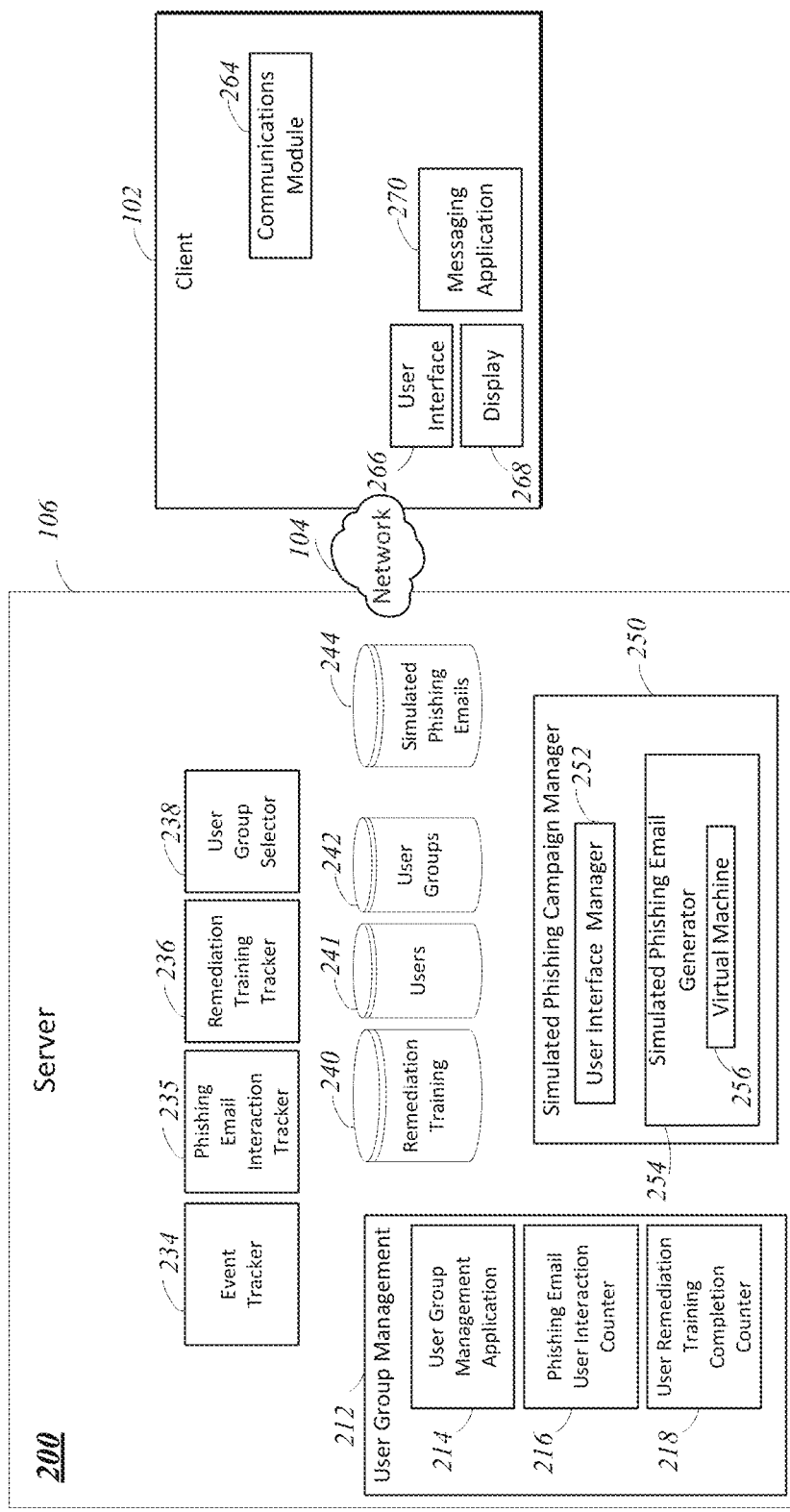
FIG. 2 depicts some of the architecture of an implementation of a system configured to automatically add users to user groups responsive to a user interacting with simulated phishing emails and responsive to a user completing electronically tracked remediation training.

Referring to FIG. 2 in a general overview, FIG. 2 depicts some of the architecture of an implementation of a system 200 capable of adding users to user groups in response to events. The system 200 is also capable of removing users from user groups in response to events.

System 200 includes a server 106. The server 106 includes a user group management function 212 which runs a simulated phishing campaign manager 250, which is responsible for executing the simulated phishing campaign. The server 106 further includes an event tracker 234, a phishing email interaction tracker 235, a remediation training tracker 236, and a user group selector 238. The user group management function 212 includes a user group management application 214, a phishing email user interaction counter 216, and a user remediation training completion counter 218. The server 106 includes several storage modules. Remediation training is stored in storage 240.

Users are stored in storage 241. User groups are stored in storage 242, and simulated phishing emails are stored in storage 244.

Each of the server 106, user group management function 212, user group management application 214, phishing email user interaction counter 216, user remediation training completion counter 218, event tracker 234, phishing email interaction tracker 235, remediation training tracker 236, user group selector 238, simulated phishing campaign manager 250, user interface manager 252, simulated phishing email generator 254, messaging application 270, and communications module 264 may comprise a program, service, task, script, library, application or any type and form of executable instructions or code executable on one or more processors. Any of the server 106, user group management function 212, user group management application 214, phishing email user interaction counter 216, user remediation training completion counter 218, event tracker 234, phishing email interaction tracker 235, remediation training tracker 236, user group selector 238, simulated phishing campaign manager 250, user interface manager 252, simulated phishing email generator 254, messaging application 270 and/or communications module 264 may be combined into one or more modules, applications, programs, services, tasks, scripts, libraries, applications, or executable code.

The simulated phishing campaign manager 250 includes a simulated phishing email generator 254, which may be implemented as or contain a virtual machine 256. Responsive to a user input, the simulated phishing campaign manager 250 generates a campaign for a simulated phishing attack, including one or more selected phishing email templates, one or more selected landing page templates, and one or more selected targeted user groups, in addition to other user input.

In an implementation, system 200 includes a server 106. The server 106 may be a part of a cluster of servers. In some embodiments, tasks performed by the server 106 may be performed by a plurality of servers. These tasks may be allocated among the cluster of servers by an application, service, daemon, routine, or other executable logic for task allocation. The server 106 may include a processor and memory.

The simulated phishing campaign manager 250 may manage various aspects of a simulated phishing attack campaign. For example, the simulated phishing campaign manager 250 may process input from the server 106 and/or may provide access as needed to various applications, modules, and other software components of the server 106 to other various applications, modules, and other software components of the server 106. The simulated phishing campaign manager 250 may monitor and control timing of various aspects of a simulated attack campaign, may process requests for access to simulated attack campaign results, and/or may perform other tasks related to the management of a simulated attack campaign.

In some embodiments, the simulated phishing campaign module 250 may be integrated with or coupled to memory 122. In some embodiments, the memory may include any type and form of storage, such as a database or file system. The memory 122 may store data such as parameters and scripts associated with a particular simulated phishing campaign. In an example, the memory 122 may store a set of parameters and scripts corresponding to the choices made by a server 106 through a simulated phishing campaign manager 250, e.g. as described above for a particular simulated phishing attack.

In an implementation, the simulated phishing campaign manager 250 includes a simulated phishing email generator 254. The simulated phishing email generator 254 may be integrated with or coupled to the memory 122 so as to provide the simulated phishing email generator 254 accesses to parameters associated with messaging choices made for a particular simulated campaign by e.g. the server 106. The simulated phishing email generator 254 may be integrated with or coupled to memory or a memory store or otherwise a storage, such as a database, containing failure remediation training 240. The simulated phishing email generator 254 may be integrated with or coupled to memory or a memory store or otherwise a storage, such as a database, containing users 241. The simulated phishing email generator 254 may be integrated with or coupled to memory or a memory store or otherwise a storage, such as a database, containing user groups 242. The simulated phishing email generator 254 may be integrated with or coupled to memory or a memory store or otherwise a storage, such as a database, containing simulated phishing emails 244. The simulated phishing email generator 254 may be an application, service, daemon, routine, or other executable logic for generating messages. The messages generated by the simulated phishing email generator 254 may be of any appropriate format. For example, they may be email messages, text messages, messages used by particular messaging applications such as, e.g., WhatsApp™, or any other type of message. Message type to be used in a particular attack may be selected by e.g. a server 106 using a simulated phishing campaign manager 250. The messages may be generated in any appropriate manner, e.g. by running an instance of an application that generates the desired message type, such as running e.g. a Gmail™ application, Microsoft Outlook™, WhatsApp™, a text messaging application, or any other appropriate application. The messages may be generated by running a messaging application on e.g. a virtual machine 256, or may simply be run on an operating system of the server 206, or may be run in any other appropriate environment. The messages may be generated to be formatted consistent with specific messaging platforms, for example Outlook 365, Outlook Web Access (OWA), Webmail, iOS, Gmail client, and so on.

In some embodiments, the simulated phishing email generator 254 can be configured to generate messages having the ability to traverse users who interact with the messages to a specific landing page.

In some embodiments, the simulated phishing email generator 254 can be configured to generate a simulated phishing email. The email can appear to be delivered from a trusted email address, such as the email address of an executive of the company at which the target is employed. In addition, the email can have a "Subject:" field that is intended to cause the user to take an action, such as initiating a wire transfer. In some embodiments, the simulated phishing email generator 254 can generate one or more simulated phishing emails which are stored in the simulated phishing emails storage 244. In some embodiments, the simulated phishing email generator 254 can generate multiple instances of the email which may be delivered to multiple users selected from the users storage 241, such as a subset of all of the employees of the company. In some embodiments, the simulated phishing email generator 254 can generate multiple instances of the email which may be delivered to a user group which is stored in the user groups storage 242. For example, the server 106 can select any number of employees who should be targeted by a simulated attack, can create a user group and store this user group in the user groups storage 242. The simulated phishing email generator 254 can retrieve this information from the user groups storage 242 and can generate a set of emails similar to the email, each addressed to a respective target identified in the information stored in the memory 122. That is, the simulated phishing email generator 254 can generate the emails such that the "From:" and "Subject:" fields of each email are identical, while the "To:" field is adjusted according to the desired targets.

The event tracker 234 detects and keeps track of events in connection with users associated with simulated phishing campaigns. An event may be any type of activity, interaction, behavior, notification, alert or communication that may occur by or in association with a user and/or a simulated phishing campaign. In one embodiment, an event comprises a number of times a user interacts with a simulated phishing email. In another embodiment, an event comprises a number of courses of the electronically tracked remediation training the user has completed since a last time the user interacted with a simulated phishing email. In one embodiment, an event comprises a number of simulated phishing campaigns run since a last time the user interacted with a simulated phishing email. In one embodiment, an event comprises the amount of time since the last time the user interacted with a simulated phishing email. In one embodiment, an event comprises the amount of time since the last time the user completed a course of the electronically tracked remediation training.

The user group management function 212 comprises a user group management application 214 that generally manages the adding of a user to a user group. For some embodiments, the user group management application 214 also manages the removal of a user from a user group. In one embodiment, the user group management application 214 manages the adding of a user of one user group to another user group responsive to a user interacting with a simulated phishing email. In a further embodiment, the user group management application 214 also manages the removing of the user from the one user group when the user is added to the other user group responsive to the user interacting with the simulated phishing email. In one embodiment, the user group management application 214 manages the adding of a user of one user group to another user group responsive to a user completing electronically tracked remediation training. In a further embodiment, the user group management application 214 also manages the removing of the same user from the one user group when the user is added to another user group responsive to the user completing electronically tracked remediation training. In one embodiment, the user group management application 214 manages the adding of a user of one user group to another user group responsive to an event related to the simulated phishing campaign. In a further embodiment, the user group management application 214 also manages the removing of the same user from the one user group when the user is added to another user group responsive to the event related to the simulated phishing campaign.

The user group management function 212 also comprises a phishing email user interaction counter 216 that counts, tracks, and/or manages a number of interactions of users with simulated phishing emails. In one embodiment, the phishing email user interaction counter 216 keeps track of how many times a given user interacts with a given simulated phishing email. In one embodiment, the phishing email user interaction counter 216 keeps track of how many times a given user interacts with any simulated phishing email. In one embodiment, the phishing email user interaction counter 216 keeps track of the amount of time between instances when a given user interacts with a specific simulated phishing email, or with any simulated phishing email. In one embodiment, the phishing email user interaction counter 216 keeps track of how many times users in a given user group interact with a specific simulated phishing email. In one embodiment, the phishing email user interaction counter 216 keeps track of the way and the number of times in which a given user interacts with a simulated phishing email, for example, the number of times that a given user clicks on a link in a simulated phishing email, or the number of times that a given user replies or forwards a simulated phishing email.

The phishing email interaction tracker 235 detects and keeps track of user interactions with simulated phishing emails by using the phishing email user interaction counter 216. In some embodiments, the phishing email interaction tracker 235 receives indications from the phishing email user interaction counter 216 any time a user interacts with a simulated phishing email. For example, the phishing email interaction tracker 235 uses the phishing email user interaction counter 216 to keep track of the user interactions which may be counted and stored in a database. In one embodiment, the phishing email interaction tracker 235 detects and keeps track of when the user clicks a link in a simulated phishing email. In one embodiment, the phishing email interaction tracker 235 detects and keeps track of when the user replies to a simulated phishing email. In one embodiment, the phishing email interaction tracker 235 detects and keeps track of when the user forwards a simulated phishing email.

The user group management function 212 also comprises a user remediation training completion counter 218 that counts, tracks, and/or manages the taking and completion of remediation training and courses. In one embodiment, the user remediation training completion counter 218 keeps track of the number of courses of electronically tracked user remediation training a user has completed. In one embodiment, the user remediation training completion counter 218 keeps track of whether a user has completed specific user remediation training. In one embodiment, the user remediation training completion counter 218 keeps track of whether the user has completed a minimum or specific subset of the electronically tracked remediation training. In one embodiment, the user remediation training completion counter 218 keeps track of the duration of time that the user spends on electronically tracked remediation training. In one embodiment, the user remediation training completion counter 218 keeps track of the total amount of time elapsed until the user has completed the electronically tracked remediation training.

The remediation training tracker 236 detects and keeps track of any electronically tracked remediation training that is assigned to a user by using the user remediation training completion counter 218. In some embodiments, the remediation training tracker 236 receives indications from the user remediation training completion counter 218 when a user has completed remediation training. For example, the remediation training tracker 236 uses the user remediation training completion counter 218 to keep track of any electronically tracked remediation training that is assigned to the user which may be counted and stored in a database. In one embodiment, the remediation training tracker 236 keeps track of one or more courses that comprise the electronically tracked remediation training. In one embodiment, the remediation training tracker 236 keeps track of one or more live, or in person, training that is assigned to a user. In one embodiment, the remediation training tracker 236 keeps track of mandatory training and non-mandatory training. In one embodiment, the remediation training tracker 236 keeps track of the amount of time that the user spends completing remediation training. In one embodiment, the remediation training tracker 236 keeps track of how many courses of the electronically tracked remediation training the user completes in a given time period.

The user group selector 238 selects a user group for a simulated phishing campaign. Each user group may include a list or collection of one or more users identified by a user name or user identifier. The user group select may select a user group to which to add a user and for some embodiments, delete or remove a user based on the user's interactions with a simulated phishing campaign, training, events, etc. For example, the user group selector 238 can use a processor to select a group in one or more storage modules (e.g., users storage 241 and user groups storage 242) in which to add and for some embodiments, delete or remove the user within the one more storage modules. In one embodiment, the user group selector 238 selects a user group to add users to if they interact with a simulated phishing email. In one embodiment, the user group selector 238 selects a user group to add users to if they interacted with a simulated phishing email and then subsequently completed the electronically tracked remediation training.

In some embodiments, the simulated phishing campaign manager utilizes the user group selector 238 to select predetermined groups to add users to in response to specific events. A user group may comprise a predetermined user group that is designated, identified, configured for or associated with a predetermined event or interaction related to a simulated phishing attack or campaign, or remediation training associated therewith. For one or more identified or specific events or interactions, the user group management function, such as via the user group selector, may identify and/or select a predetermined or specific user group for which to add a user based on the event or interaction. For example, user group with user group identified or named A may be used for adding users related to one event or interaction while user group with user group identified or named B may be used for adding users related to another event or interaction. In some embodiments, user interactions associated with the simulated phishing attacks, campaigns and training and events associated therewith may be classified into categories and the categories mapped to or associated with a predetermined user group to which the user is to be added. In some embodiments, user interactions associated with the simulated phishing attacks, campaigns and training and events associated therewith may be classified into or mapped to or associated with a predetermined user group to which the user is to be added.

In an implementation, a simulated phishing campaign manager 250 may be e.g., another name for a system administrator, such as a security manager, a third party security consultant, a risk assessor, or any other party that uses the simulated phishing campaign manager 250 installed on a server. The server 106 may wish to direct a simulated phishing attack by interacting with the simulated phishing campaign manager 250 installed on the server. The simulated phishing campaign manager 212 may be, for example, a desktop computer, a laptop computer, a mobile device, or any other suitable computing device. The simulated phishing campaign manager 250 may be e.g., an application on a device that allows for a user of the device to interact with the server 106 for e.g. purposes of creating, configuring, tailoring and/or executing a simulated phishing attack and/or viewing and/or processing and/or analyzing the results of a phishing attack.

In an implementation, the simulated phishing campaign manager 250, when executed, causes a graphical user interface to be displayed to the server 106. In other embodiments, the simulated phishing campaign manager 250 allows for user input through a non-graphical user interface, such as a user interface that accepts text or vocal input without displaying an interactive image. A graphical user interface may be displayed on a screen of a mobile phone, or a monitor connected to a desktop or laptop computer, or may be displayed on any other display. The user may interact with e.g. the graphical user interface on the device by typing, clicking a mouse, tapping, speaking, or any other method of interacting with a user interface. The graphical user interface on the device may be a web-based user interface provided by a web browser (e.g. GOOGLE CHROME, Microsoft INTERNET EXPLORER, or Mozilla Firefox provided by Mozilla Foundation of Mountain View, Calif.), or may be an application installed on a user device capable of opening a network connection to simulated phishing campaign manager 250, or may be any other type of interface.

In an implementation, the simulated phishing campaign manager 250 and/or server 106 may make choices concerning how a simulated phishing attack is to be carried out. For example, a graphical user interface run by the simulated phishing campaign manager 250 may be displayed to the server 106. A user via the server 106 may input parameters for the attack that affect how it will be carried out. For example, via the server 106 a user may make choices as to which users to include as potential targets in the attack, the method of determining which users are to be selected as targets of the attack, the timing of various aspects of the attack, whether to use an attack template that includes values for one or a plurality of failure indicators, how responses from targeted users should be uniquely identified, and other choices. These choices may be made by selecting options displayed on a graphical user interface from dropdown menus, being presented with choices through a simulated attack wizard, or in any other appropriate manner.

In an implementation, the simulated phishing campaign manager 250 may allow the server 106, such as via application programming interfaces (APIs), to access and/or change settings of an account maintained with any party involved with the attack, such as, for example, a third party security service provider, or may allow the user group management function 212 to access and/or change settings of an account maintained with a third party security service provider, such as one that e.g. manages an exploit server, view bills and/or make payments to a third party security service provider, to perform these functions with other third parties involved in the attack, or provide any other functions that would be appropriate for facilitating communications between the server 106 and any other parties involved in the attack.

The system 200 includes also the client 102. A client may be a target of any simulated phishing attack. For example, the client may be an employee, member, or independent contractor working for an organization that is performing a security checkup or conducts ongoing simulated phishing attacks to maintain security. The client 102 may be any device used by the client. The client need not own the device for it to be considered a client device 102. The client 102 may be any computing device, such as a desktop computer, a laptop, a mobile device, or any other computing device. In some embodiments, the client 102 may be a server or set of servers accessed by the client. For example, the client may be the employee or a member of an organization. The client may access a server that is e.g. owned or managed or otherwise associated with the organization. Such a server may be a client 102.

In some embodiments, the client 102 may further include a user interface 266 such as a keyboard, a mouse, a touch screen, or any other appropriate user interface. This may be a user interface that is e.g. connected directly to a client 102, such as, for example, a keyboard connected to a mobile device, or may be connected indirectly to a client 102, such as, for example, a user interface of a client device used to access a server client 102. The client 102 may include a display 268, such as a screen, a monitor connected to the device in any manner, or any other appropriate display.

In an implementation, the client 102 may include a messaging application 270. The messaging application 270 may be any application capable of viewing, editing, and/or sending messages. For example, the messaging application 270 may be an instance of an application that allows viewing of a desired message type, such as any web browser, a Gmail™ application, Microsoft Outlook™, WhatsApp™, a text messaging application, or any other appropriate application. In some embodiments, the messaging application 270 can be configured to display simulated phishing attack emails. Furthermore, the messaging application 270 can be configured to allow the target to generate reply messages or forwarded messages in response to the messages displayed by the messaging application 270.

In some embodiments, the client 102 may include a communications module 264. This may be a library, application programming interface (API), set of scripts, or any other code that may facilitate communications between the client 102 and any of the server 106, a third party server, or any other server. In some embodiments, the communications module 264 determines when to transmit information from the client 102 to external servers via a network 104. In some embodiments, the information transmitted by the communications module 264 may correspond to a message, such as an email, generated by the messaging application 270.

In some embodiments, the server 106 includes a simulated phishing campaign manager 250. This simulated phishing campaign manager 250 analyzes which phishing email templates are most effective in generating user failures when the template is used in a simulated phishing attack. The simulated phishing campaign manager 250 additionally determines what the most common failure types are for a given template. The simulated phishing campaign manager 250 may perform additional analysis across many different templates used to determine which failure indicators lead to the highest rate of failures.

For example, the simulated phishing campaign manager 250 may include data collected from targets, records of failures such as a listing of which targets replied to a simulated phishing email, systemic or other security measures in place during the simulated phishing attacks, time or date logs, user identifiers, data detailing the results or analysis of attack results including data that indicates associations between attack results, and any other appropriate data. The server 106 may view, save, share, print, or perform any other appropriate action with the attack results. The simulated phishing campaign manager 250 may perform analysis on the attack results, possibly upon request of the server 106. For example, this analysis may include determining which users are a security risk based on having a number of failures above a predetermined threshold, whether certain security systems in place are effective by e.g. correlating the presence of such security systems with a lower than average incidence of failures. The simulated phishing campaign manager 250 may allow an attack manager to view, on a graphical user interface run by the attack management application 214, such as for example a timeline of overall failure rates, which may be useful in helping to determine whether a security policy that was instituted at a particular time was effective in improving security.

In some embodiments, reply emails sent from the client to the server 106 can be processed by the simulated phishing campaign manager 250. For example, simulated phishing campaign manager 250 can be configured to process reply emails received from one or more target clients 260 to determine the identities of the targets who sent the reply emails. In some embodiments, the identities of the targets may be determined based in part on the unique identifiers included within each reply email received by the server 106.

The system 200 may include a network 104. The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network. The network 104 connects the server 106 and a client 102. The client 102 comprises a communications module 264, a user interface 266, a display 268, a messaging application 270, and a memory such as any embodiments of memory 122 described herein or any type and form of storage, such as a database or file system) The client 102 receives the email sent by the server 106 based upon the campaign created and executed by the simulated phishing campaign manager 250. The client 102 is able to receive the simulated phishing email via the messaging application 270, display the received email for the user using the display 268, and is able to accept user interaction via the user interface 266 responsive to the displayed email. If the user interacts with the simulated phishing email, the client traverses to a landing page used by the simulated phishing campaign manager 250 in the phishing campaign.

Referring to FIG. 3A in a general overview, FIG. 3A depicts an implementation of a method 300 for adding users to user groups. In a brief overview, the method 300 can include receiving a selection of a first user group for which to communicate simulated phishing emails of a simulated phishing email campaign (step 310). The method 300 can include receiving a selection of a second user group for which to add those users that interact with a simulated phishing email of a simulated phishing email campaign (step 320). The method can include receiving a first indication that a user of the first user group interacted with a simulated phishing email (step 330). The method can include, responsive to the first indication, automatically adding the user, who is a member of the first user group, to the second user group (step 340). The method can include receiving a second indication that the user completed remediation training (step 350). The method can include, responsive to the second indication, adding the user, who is a member of the second user group, back to the first user group (for embodiments where the user was removed from the first user group) or to a third user group (step 360).

In some embodiments, the simulated phishing campaign manager 250 may receive the selection of the first user group at step 310 and the selection of the second user group at step 320 via any type of interface, for example a graphical user interface (GUI), and application program interface (API), or a command line interface (CLI). The interface may be menu driven, or form based, or may be based on natural language processing or may be gesture driven. The first user group may be an existing user group, or the system administrator may create a new user group from scratch. The simulated phishing campaign manager 250 may receive one user group or may receive more than one user group to receive the simulated phishing emails of the simulated phishing campaign. In one embodiment, the simulated phishing campaign manager 250 receives a user group by enabling the creation of a custom user group. For example, one user group can be designated as holding or otherwise storing users selected to receive a simulated phishing email. In another example, a user group can be designated as holding or otherwise storing users that interacted with a simulated phishing email (e.g., by clicking on a link in the email). In another example, a user group can be designated as holding or otherwise storing users that did not interact with a simulated phishing email (e.g., did not click on a link in email). Other examples of group designations may be appreciated by one of skill in the art.

In some embodiments, the simulated phishing campaign manager 250 receives a first indication that a user of the first user group interacted with a simulated phishing email at step 330 through the use of the phishing email interaction tracker 235 receiving indications from the phishing email user interaction counter 216.

In some embodiments, at step 340, responsive to receiving the first indication that a user of the first user group interacted with a simulated phishing email, the simulated phishing campaign manager 250 automatically adds the user, who is a member of the first user group, to the second user group. The simulated phishing campaign manager 250 automatically adds the user to user groups. In some embodiments, the simulated phishing campaign manager 250 also automatically removes the user from user groups.

In some embodiments, the simulated phishing campaign manager 250 receives a second indication that the user completed remediation training at step 350 through the use of the remediation training tracker 236 receiving indications from the user remediation training completion counter 218.

In some embodiments, at step 360, responsive to receiving the second indication that the user completed remediation training, the simulated phishing campaign manager 250 automatically adds the user, who is a member of the second user group, back to the first user group (for embodiments where the user was removed from the first user group) and to a third user group. The simulated phishing campaign manager 250 automatically adds the user to user groups. In some embodiments, the simulated phishing campaign manager 250 also automatically removes the user from user groups.

FIG. 3B depicts one embodiment of an implementation of a method 300 for adding the user to user groups. In a brief overview, the method 300 can include receiving a selection of a first user group for which to communicate simulated phishing emails of a simulated phishing email campaign (step 310). The method 300 can include receiving a selection of a second user group for which to add those users that interact with a simulated phishing email of a simulated phishing email campaign (step 320). The method can include receiving a first indication that a user of the first user group interacted with a simulated phishing email (step 330). The method can include tracking the number of times the user has interacted with simulated phishing emails (step 332). The method can include, responsive to the number of times the user has interacted with simulated phishing emails reaching a predetermined threshold, automatically adding the user, who is a member of the first user group, to the second user group (step 342). The method can include receiving a second indication that the user completed remediation training (step 350). The method can include, responsive to the second indication, adding the user, who is a member of the second user group, back to the first user group (for embodiments where the user was removed from the first user group) or to a third user group (step 360).

In some embodiments, at step 332, the system tracks the total number of times ever that a given user has interacted with a simulated phishing email. In some embodiments, the system tracks the number of times that a given user has interacted with a simulated phishing email since the start of a specific simulated phishing campaign. In one embodiment, the system resets the count when the user completes remediation training related to simulated phishing emails. In one embodiment, the system administrator may manually reset the count of the number of times that a given user has interacted with a simulated phishing email.

In some embodiments, at step 342, the predetermined threshold is specific to the first user group. In some embodiments, the predetermined threshold is specific to a given user. In some embodiments, the threshold is predetermined at the start of the simulated phishing campaign. In some embodiments, there is a unique threshold for different types of user interactions with the simulated phishing email. In one embodiment, there is a unique predetermined threshold for the number of times the user interacted with the simulated phishing email by clicking on a link in the email. In one embodiment, there is a unique and predetermined threshold for the number of times the user interacted with the simulated phishing email by replying to the simulated phishing email.

Referring to FIG. 3C in a general overview, FIG. 3C depicts an implementation of a method 300 for adding a user to user groups. In a brief overview, the method 300 can include receiving a selection of a first user group for which to communicate simulated phishing emails of a simulated phishing email campaign (step 310). The method 300 can include receiving a selection of a second user group for which to add those users that interact with a simulated phishing email of a simulated phishing email campaign (step 320). The method can include receiving a first indication that a user of the first user group interacted with a simulated phishing email (step 330). The method can include, responsive to the first indication, automatically adding the user, who is a member of the first user group, to the second user group (step 340). The method can include tracking the number of courses of electronically tracked remediation training the user has completed (step 344). The method can include receiving a second indication that the user completed remediation training (step 350). The method can include, responsive to the second indication, automatically adding the user, who is a member of the second user group, to a predetermined user group corresponding to one or more courses of the number of courses the user has completed (step 362).

In some embodiments, at step 344, tracking the number of courses of electronically tracked remediation training the user has completed through the use of the remediation training tracker 236 receiving indications from the user remediation training completion counter 218.

Referring to FIG. 3D in a general overview, FIG. 3D depicts an implementation of a method 300 for adding a user to user groups. In a brief overview, the method 300 can include receiving a selection of a first user group for which to communicate simulated phishing emails of a simulated phishing email campaign (step 310). The method 300 can include receiving a selection of a second user group for which to add those users that interact with a simulated phishing email of a simulated phishing email campaign (step 320). The method can include receiving a first indication that a user of the first user group interacted with a simulated phishing email (step 330). The method can include, responsive to the first indication, automatically adding the user, who is a member of the first user group, to the second user group (step 340). The method can include receiving a second indication that the user completed remediation training (step 350).

FIG. 3D illustrates an embodiment where added users may be removed from one user group but added users remain members of a different user group. For example, the method can include, responsive to the second indication, keeping the user in the second user group while adding the user to either the first user group (where the user was removed from the first user group) or a third user group (step 354).

In some embodiments, at step 354, responsive to the second indication, the user remains a member of the second user group while the user is added back to the first user group (for embodiments where the user was removed from the first user group) or to a third user group through the use of the simulated phishing campaign manager 250. The simulated phishing campaign manager 250 adds users to user groups and for some embodiments, removes users from user groups.

Figure 4:
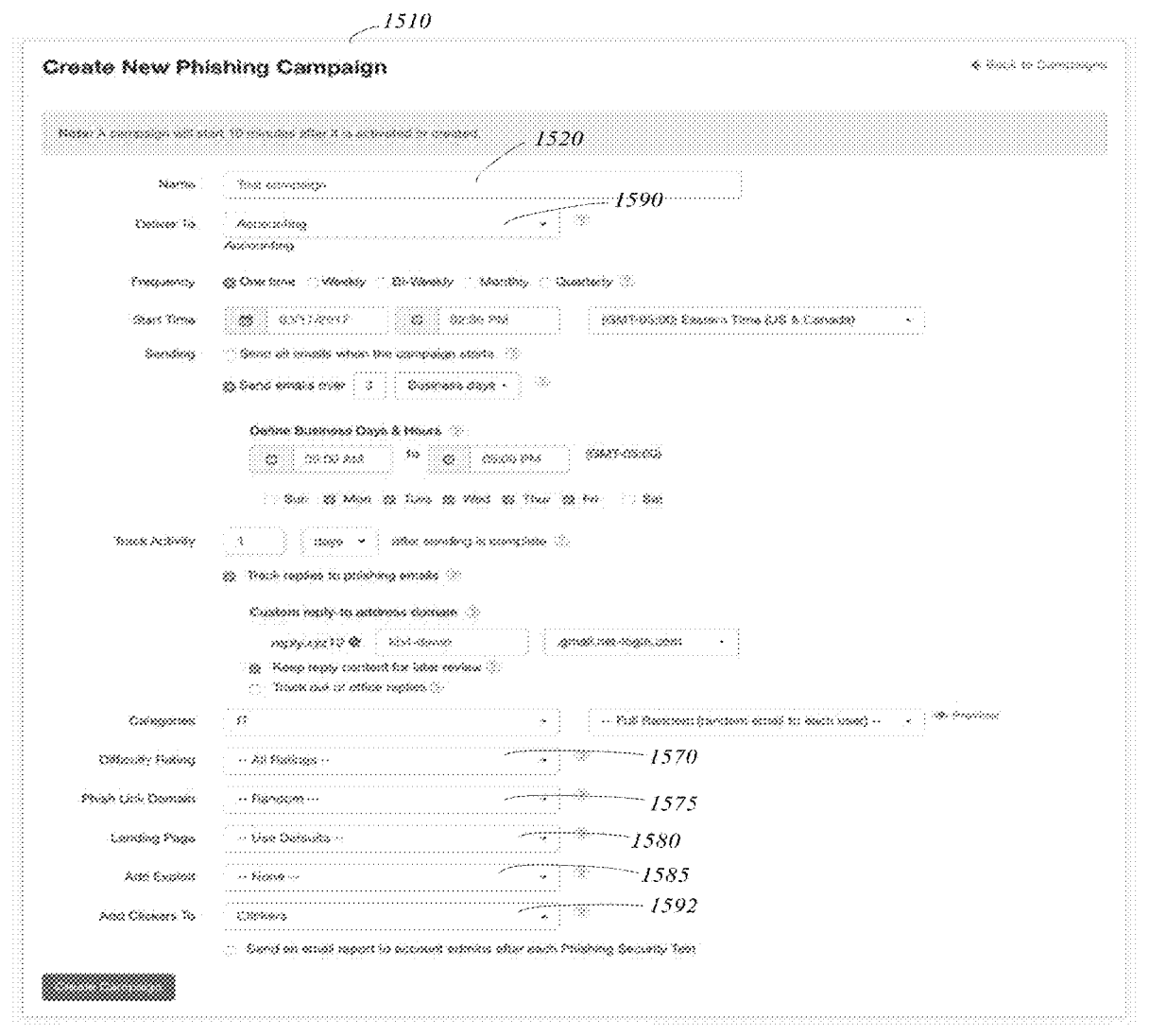

FIG. 4 illustrates an example screen for creating a new phishing campaign 1510. The system administrator can give the new phishing campaign 1510 a name 1520 (e.g., "Test campaign") so that it can be easily identified at a later date. The system administrator also can select a difficulty rating 1570 for the new phishing campaign 1510. In some implementations, the difficulty rating can refer to the level of sophistication of the phishing campaign. For example, selecting a higher degree of difficulty may be expected to result in a larger percentage of users interacting with one or more failure indicators included within the phishing campaign, as the failure indicators included in a more difficult phishing campaign may be harder for users to detect. The system administrator also can select a phishing link domain 1575. The domain for the phishing link may be selected to mimic a domain associated with a trusted entity, such as a financial institution, so that a user who is redirected to the selected domain after selecting a link as part of the phishing campaign may believe that he or she has arrived at a website hosted by the trusted entity. The system administrator also can select a landing page 1580 to use for the new phishing campaign 1510. The system administrator also can choose to add an exploit 1585 to the new phishing campaign 1510. For example, an exploit may be any type or form of malicious behavior, such as the unauthorized collection of user data, that is triggered as a result of a user interacting with one or more failure indicators in the phishing campaign.

In creating the new phishing campaign 1510, the system administrator can select a first user group and a second user group. For example, the system administrator can select a first user group 1590 (e.g., "Accounting") including users for which to communicate simulated phishing emails of a simulated phishing email campaign. Also, the system administrator can select a second user group 1592 (e.g., "Clickers") for which to add those users that interact with the simulated phishing emails of the simulated phishing email campaign (e.g., users who interact with one or more failure indicators). The second user group 1592 may be formed by adding an indication for each such user of the first user group 1590 to a data structure, so that the users of the first user group 1590 who interacted with the simulated phishing email are automatically added to the second user group 1592 responsive to the indication.

Figure 5A:
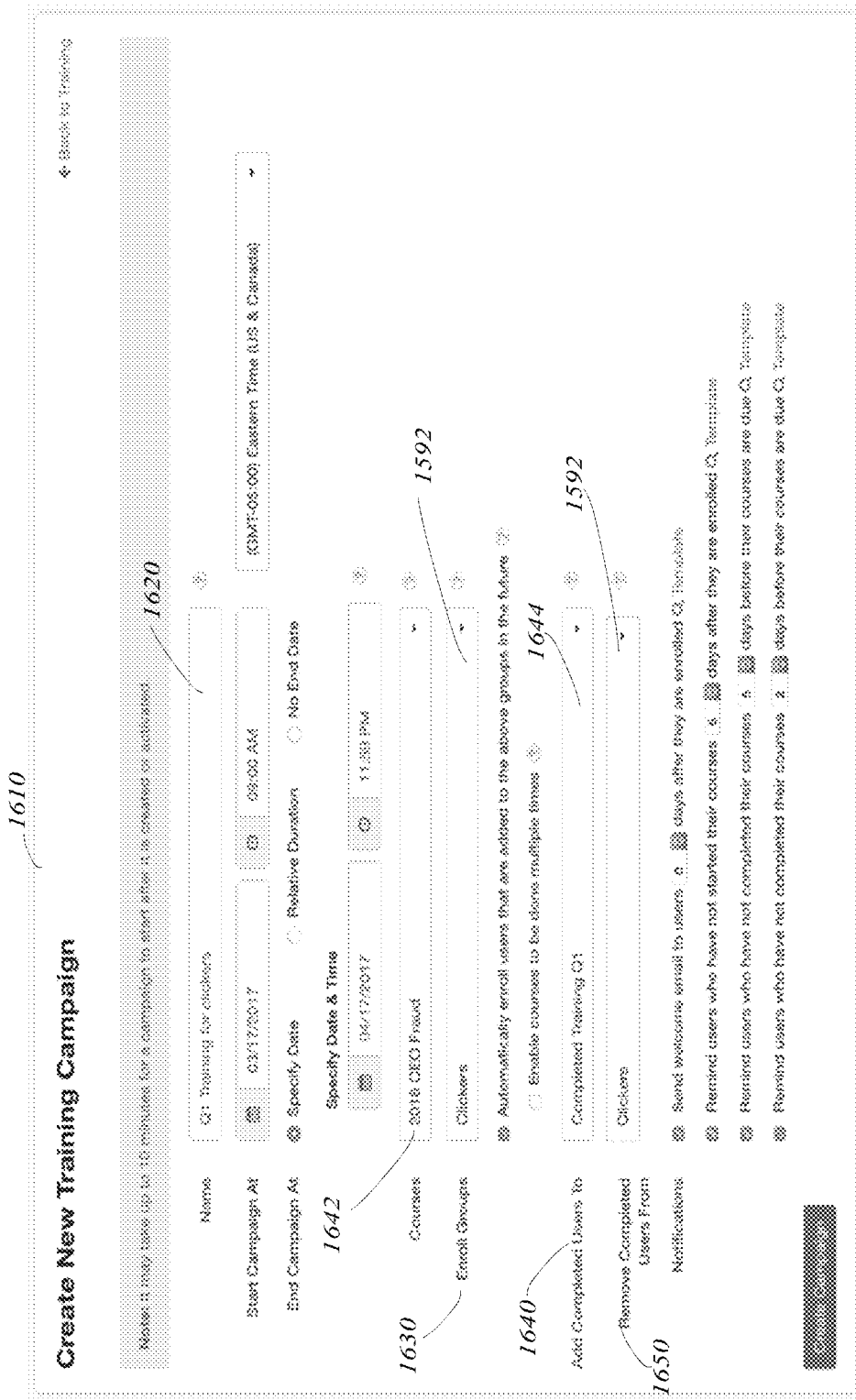
FIG. 5A depicts an example of creating a new training campaign that includes selection of a predetermined user group or a third user group for which to add users that complete a remediation training (e.g., completing one or more courses).

FIG. 5A illustrates an example screen for creating a new training campaign 1610. The system administrator can give the new training campaign 1610 a name 1620 (e.g., "Q1 Training for clickers") so that it can be easily identified at a later date. The system administrator can also choose a course 1642 (e.g., "2016 CEO Fraud") to add to the new training campaign 1610 as part of remediation training. Users can be tracked with respect to completion of the course 1642.

In creating the new training campaign 1610, the system administrator can generally select user groups to be enrolled in the new training campaign as well as select user groups for users to be added to and/or select user groups for users to be removed from. For example, the system administrator can select a group to be enrolled 1630 in a remediation training. In the illustrated example, the system administrated selects the second user group 1592 (e.g., "Clickers") to be enrolled in completion of the course 1642. By setting up the new training campaign 1610, the users can then electronically track the completion of the remediation training (e.g., completion of the course 1642). Also, the system administrator can select a user group 1640 for which to add those users of the enrolled second user group 1592 who have completed the course 1642. In the illustrated example, the group selected is a predetermined user group 1644 that corresponds to one or more courses (e.g., "Completed Training Q1") or a third user group. The predetermined user group 1644 or the third user group may be formed by adding an indication for each such user, who is a member of the second user group 1592, to a data structure, so that the users that completed remediation training (e.g., completed the course 1642) are automatically added to the predetermined user group 1644 or the third user group responsive to the indication. The system administrator can also select a user group for users to be removed from 1650 after completion of the remediation training (e.g., completion of course 1642). In the illustrated example, the system administrator selected the second user group 1592 (e.g., "Clickers") such that users are automatically removed from the second user group 1592 responsive to the indication that the users completed remediation training (e.g., completed the course 1642).

Figure 5B:
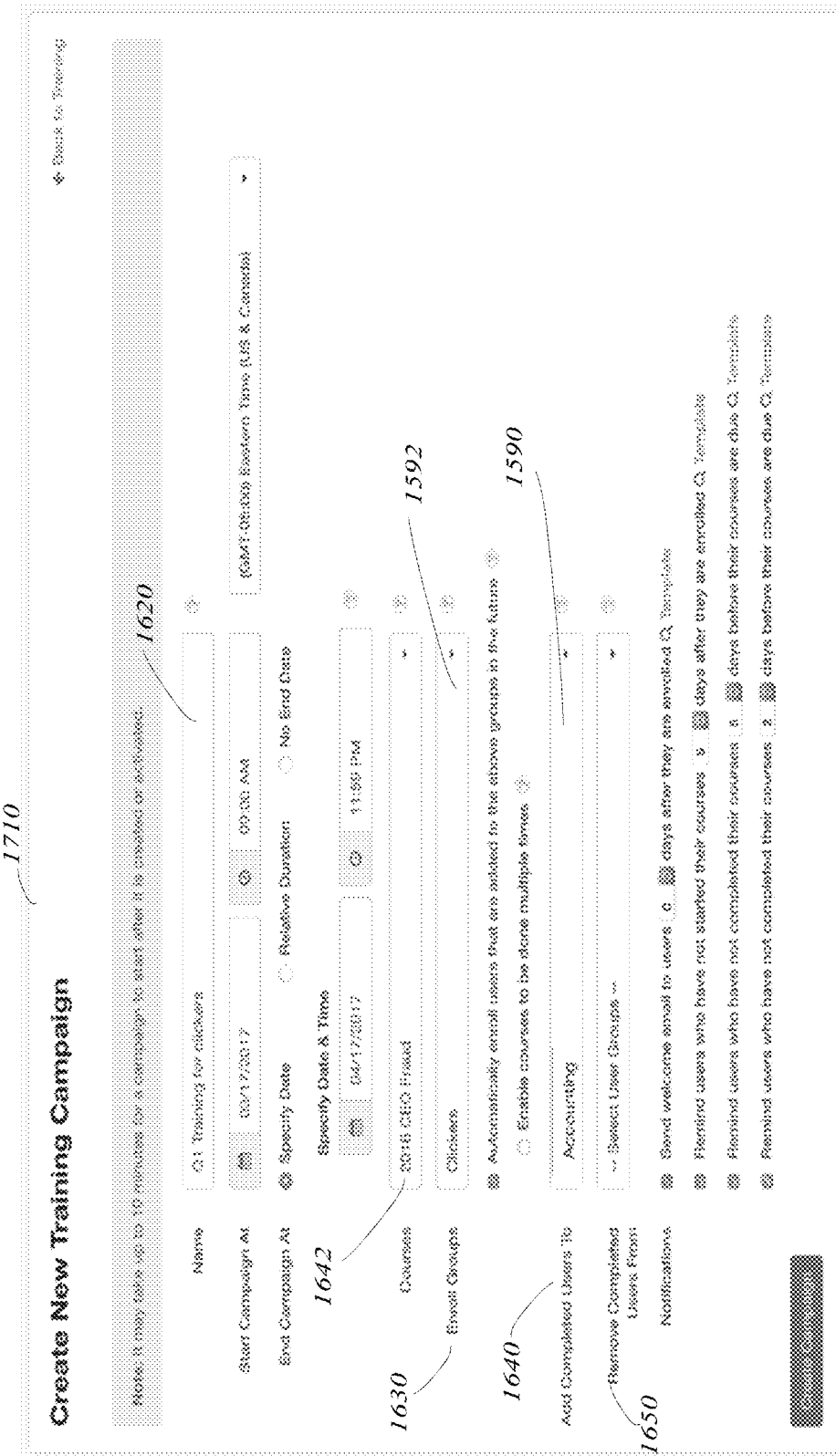
FIG. 5B depicts another example of creating a new training campaign that includes selection of a first user group for which to add users that complete remediation training such as completing one or more courses.

FIG. 5B depicts another example screen for creating a new training campaign 1710, according to an illustrative example. The screen 1710 is similar to the screen 1610 shown in FIG. 5A, but differs from the screen 1610 in that the screen 1710 shows the first user group 1590 (e.g., "Accounting") being selected for which to add those users of the enrolled second user group 1592 (e.g., "Clickers") who have completed remediation training (e.g., completed the course 1642). In this example, users added to the second user group 1592 were also removed from the first user group 1590. The users, who are members of the second user group 1592, that complete the remediation training (e.g., complete the course 1642) are automatically added back to the first user group 1590.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A method comprising:
   (a) receiving, by one or more processors coupled to memory, a first indication of a first user interaction associated with a simulated phishing communication to a user of a first user group of a plurality of user groups;
   (b) identifying, by the one or more processors, a category from a plurality of categories for the first user interaction, each of the plurality of categories associated with one or more interactions with one or more simulated phishing communications and mapped to at least one of the plurality of user groups; and
   (c) including, by the one or more processors, the user in a second user group of the plurality of user groups mapped to the category, and
   (d) communicating, by the one or more processors, a second simulated phishing communication to the user of the second user group.

2. The method of claim 1, wherein the first user interaction comprises a number of times the user interacted with simulated phishing communications.

3. The method of claim 2, wherein (b) further comprises identifying the category based as least on the number of times reaching a threshold.

4. The method of claim 1, wherein (b) further comprises classifying, by the one or more processors, the first user interaction into the category of a plurality of categories.

5. The method of claim 1, wherein (c) further comprises adding, by the one or more processors, the user to the second user group while keeping the user in the first user group.

6. The method of claim 1, wherein (c) further comprises adding, by the one or more processors, the user to the second user group while remover the user from the first user group.

7. A system comprising:
   one or more processors coupled to memory, and configured to:
   receive a first indication of a first user interaction associated with a simulated phishing communication to a user of a first user group of a plurality of user groups;
   identify a category from a plurality of categories for the first user interaction, each of the plurality of categories associated with one or more interactions with one or more simulated phishing communications and mapped to at least one of the plurality of user groups; and
   include the user in a second user group of the plurality of user groups mapped to the category, and
   communicate a second simulated phishing communication to the user of the second user group.

8. The system of claim 7, wherein the first user interaction comprises a number of times the user interacted with simulated phishing communications.

9. The system of claim 8, wherein the one or more processors are configured to identify the category based as least on the number of times reaching a threshold.

10. The system of claim 7, wherein the one or more processors are configured to classify the first user interaction into the category of a plurality of categories.

11. The system of claim 7, wherein the one or more processors are configured to add the user to the second user group while keeping the user in the first user group.

12. The system of claim 7, wherein the one or more processors are configured to add the user to the second user group while remover the user from the first user group.

13. A method comprising:
   (a) communicating, by one or more processors coupled to memory, a first simulated phishing communication to a user of a first user group of a plurality of users groups;
   (b) detecting, by the one or more processors, an event associated with the first simulated phishing communication to the user;
   (c) including, by the one or more processors, the user in a second user group of the plurality of user groups based at least on the event, and
   (d) communicating, by the one or more processors, a second simulated phishing communication to the user of the second user group.

14. The method of claim 13, wherein the event comprises an interaction by the user with the first simulated phishing communication.

15. The method of claim 13, wherein the event comprises a predetermined number of times the user has interacted with one or more simulated phishing communications.

16. The method of claim 13, wherein (c) further comprising moving, by the one or more processors, the user from the first user group to the second user group based at least on the event.

17. A system comprising:
 one or more processors coupled to memory, and configured to:
 communicate a first simulated phishing communication to a user of a first user group of a plurality of users groups;
 detect an event associated with the first simulated phishing communication to the user;
 include the user in a second user group of the plurality of user groups based at least on the event, and
 communicate a second simulated phishing communication to the user of the second user group.

18. The system of claim 17, wherein the event comprises an interaction by the user with the first simulated phishing communication.

19. The system of claim 17, wherein the event comprises a predetermined number of times the user has interacted with one or more simulated phishing communications.

20. The system of claim 17, wherein the one or more processors are configured to move the user from the first user group to the second user group based at least on the event.

\* \* \* \* \*